(12) United States Patent
Lin et al.

(10) Patent No.: US 8,840,322 B2
(45) Date of Patent: Sep. 23, 2014

(54) CONNECTOR ASSEMBLY WITH FLOATABLE OPTICAL TERMINATION

(75) Inventors: Hsien-Chu Lin, New Taipei (TW); Hsiang-Chi Wen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 417 days.

(21) Appl. No.: 13/284,951

(22) Filed: Oct. 30, 2011

(65) Prior Publication Data

US 2012/0106894 A1 May 3, 2012

(30) Foreign Application Priority Data

Oct. 29, 2010 (TW) .................................. 099220892

(51) Int. Cl.
*G02B 6/36* (2006.01)
*G02B 6/42* (2006.01)
*G02B 6/38* (2006.01)

(52) U.S. Cl.
CPC ............ *G02B 6/3817* (2013.01); *G02B 6/3821* (2013.01)
USPC .................................. 385/90; 385/74; 385/93

(58) Field of Classification Search
USPC ................................................ 385/74, 90, 93
See application file for complete search history.

(56) References Cited

U.S. PATENT DOCUMENTS

2011/0091162 A1\* 4/2011 He et al. ......................... 385/75

FOREIGN PATENT DOCUMENTS

CN 101345358 1/2009

\* cited by examiner

*Primary Examiner* — Jerry Rahll
(74) *Attorney, Agent, or Firm* — Wei Te Chung; Ming Chieh Chang

(57) ABSTRACT

An connector assembly (100) includes an insulative housing (1) having a main portion (11) and a tongue portion (12) extending forwardly from the main portion, a cavity (121) defined in the tongue portion; a plurality of terminals (2) retained in the insulative housing; an optical module (3) accommodated in the cavity, said optical module having a base portion and a plurality of lenses combined with the base portion; and a biasing member (4) having a holder (40), an elastic element (43) accommodated in the holder and at least one post assembled to the holder and urged by the elastic element so as to push the optical module forwardly.

17 Claims, 6 Drawing Sheets

US 8,840,322 B2

CONNECTOR ASSEMBLY WITH FLOATABLE OPTICAL TERMINATION

FIELD OF THE INVENTION

The present invention generally relates to a connector assembly, and more particularly to a connector assembly adapted for optical and electrical transmitting.

DESCRIPTION OF PRIOR ART

In many of today's processing systems, such as personal computer (PC) systems, there exist universal serial bus (USB) ports for connecting various USB devices. Different standards of USB technology for different bandwidths have been launched by USB-IF supported by some of world largest IT companies. For instance, Universal Serial Bus Specification, revision 1.1 devices are capable of operating at 12 Mbits/second (Mbps). Universal Serial Bus Specification, revision 2.0 devices are capable of operating at 480 Mbps. Universal Serial Bus Specification, revision 3.0 devices are capable of operating at higher speed also accepted by market, gradually. However, as technology progresses engineers are constantly striving to increase operating speeds.

For example, CN Pub. Pat. No. 101345358 published on Jan. 14, 2009 discloses an optical USB connector assembly which has a fiber device added to a USB connector assembly. The fiber device has a number of fibers connected with lenses embedded in the USB connector. Thus, optical signal transmits along a first fiber and is expanded/magnified by a first lens terminated to the first fiber, and then shrunk by a second lens and runs through second fiber of a complementary connector. However, as the lenses are positioned in the insulative housing, and they may not align with their counterparts of a complementary connector, if there is a relative big error in manufacturing proceeding.

Hence, an improved connector assembly is highly desired to overcome the aforementioned problems.

SUMMARY OF THE INVENTION

Accordingly, an object of the present invention is to provide a connector assembly with floatable optical termination.

In order to achieve the object set forth, a connector assembly in accordance with the present invention comprises an insulative housing having a main portion and a tongue portion extending forwardly from the main portion, a cavity defined in the tongue portion; a plurality of terminals retained in the insulative housing; an optical module accommodated in the cavity, said optical module having a base portion and a plurality of lenses combined with the base portion; and a biasing member having a holder, an elastic element accommodated in the holder and at least one post assembled to the holder and urged by the elastic element so as to push the optical module forwardly.

Other objects, advantages and novel features of the invention will become more apparent from the following detailed description when taken in conjunction with the accompanying drawings.

DETAILED DESCRIPTION OF PREFERRED EMBODIMENTS

Reference will now be made in detail to the preferred embodiment of the present invention.

Figure 1:
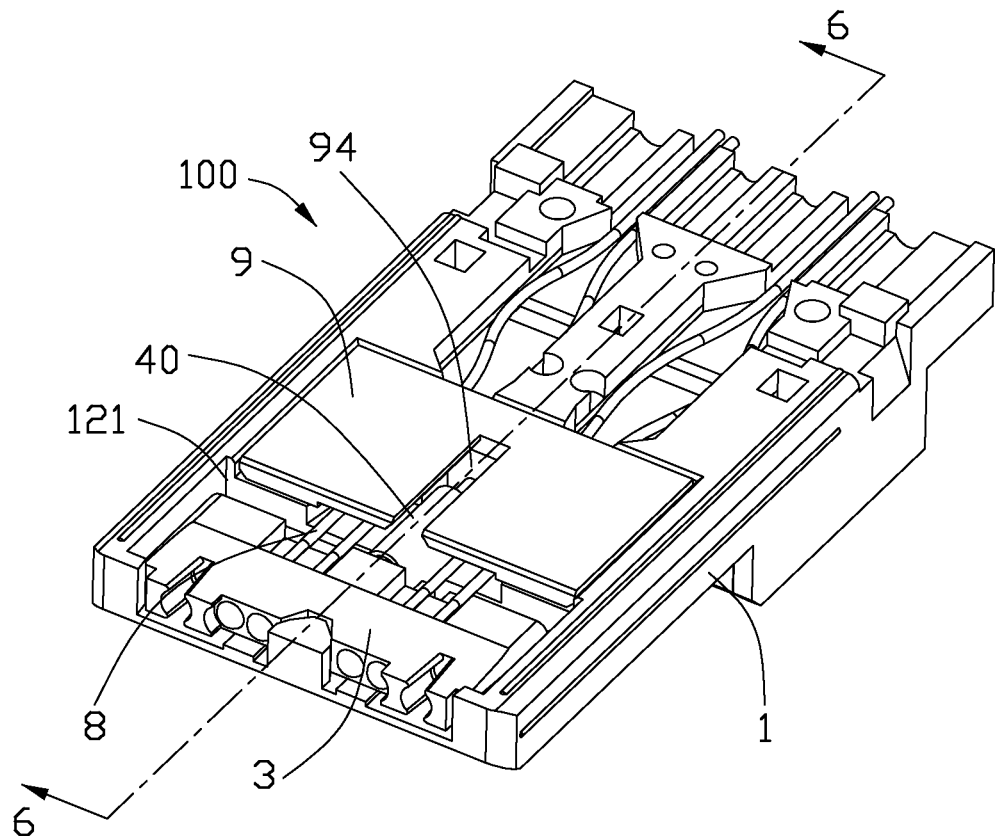
FIG. 1 is an assembled, perspective view of the connector assembly, with a metallic shell removed away.
Figure 2:
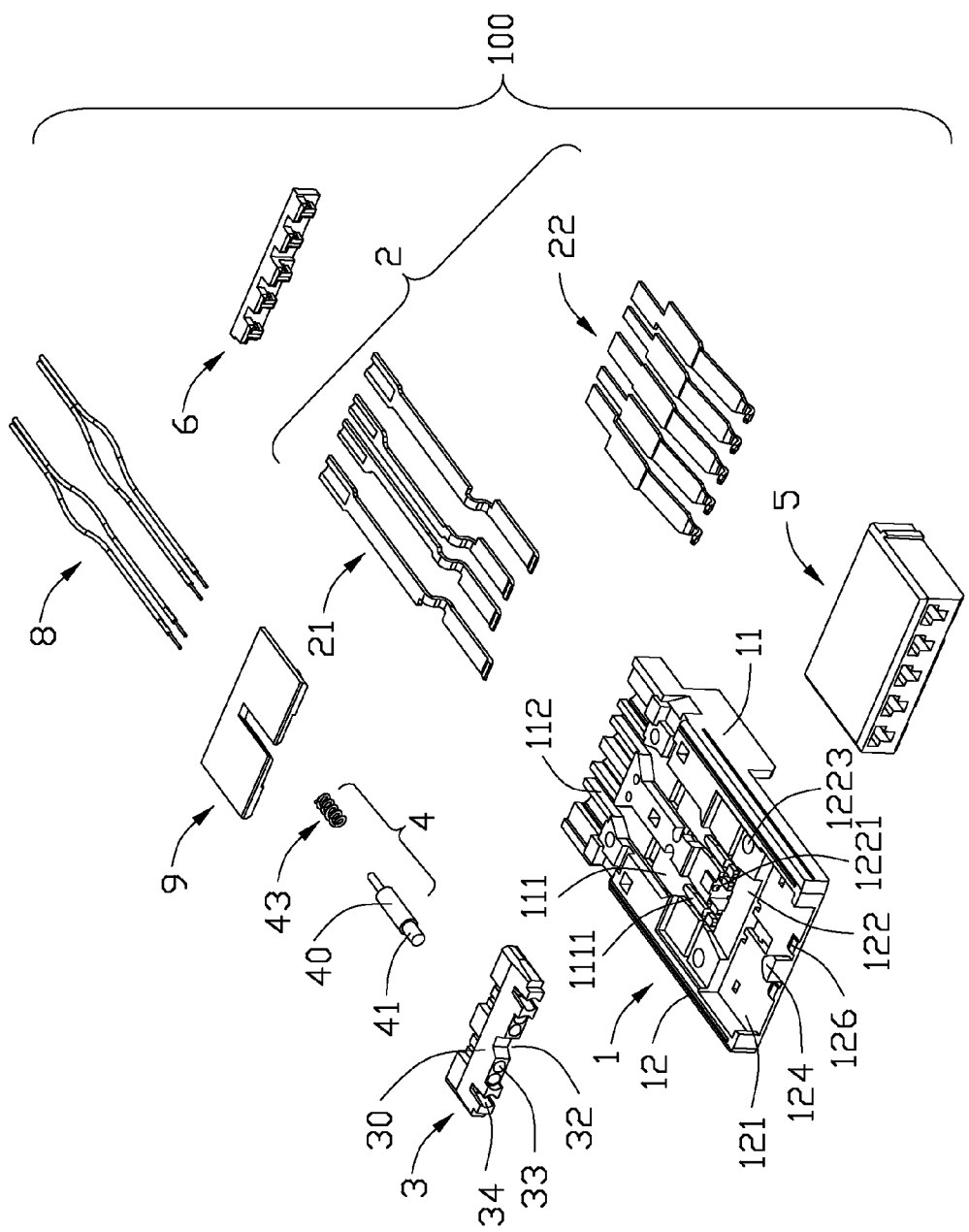
FIG. 2 is an exploded, perspective view of FIG. 1.
Figure 3:
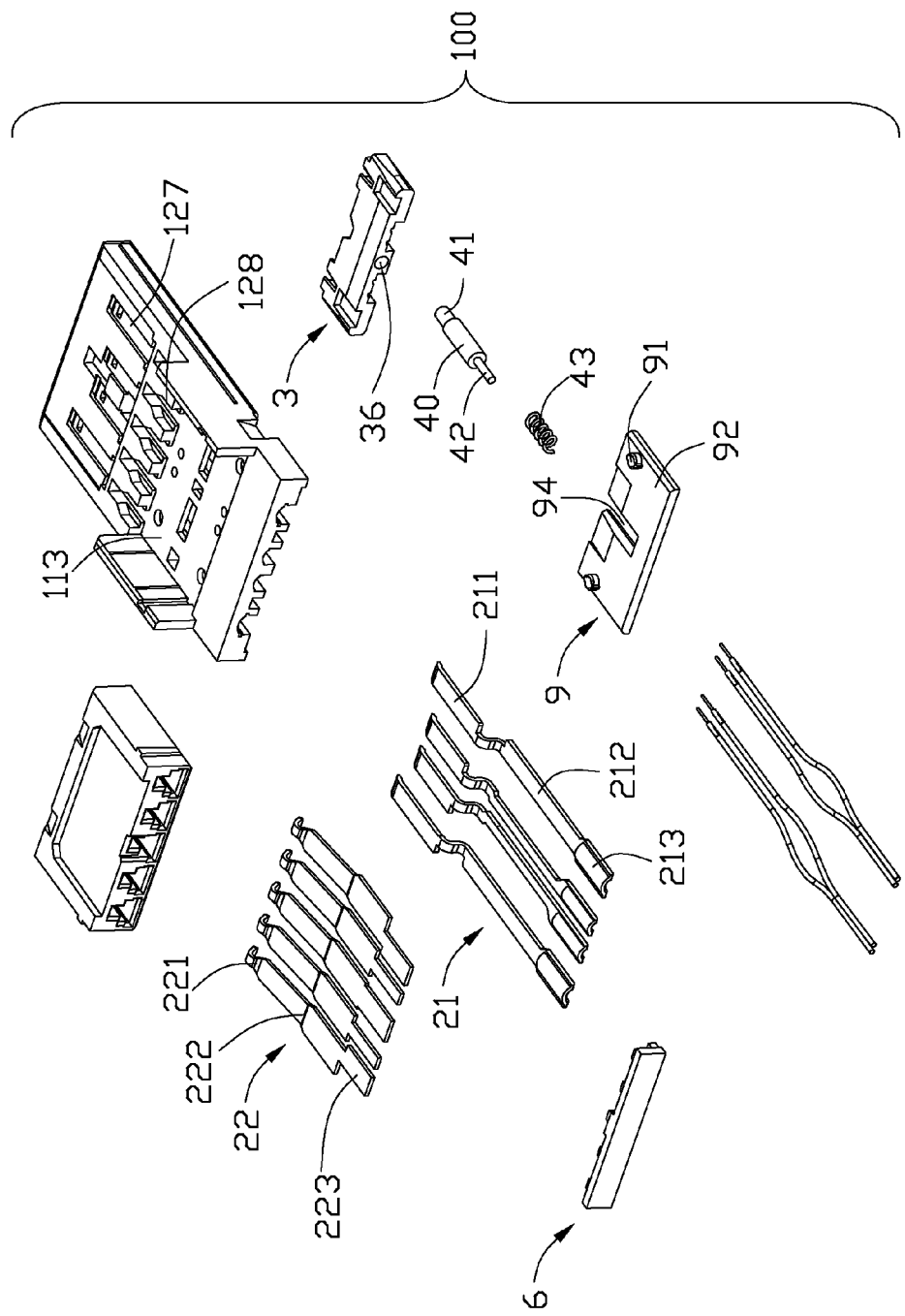
FIG. 3 is similar to FIG. 2, but viewed from another aspect.
Figure 4:
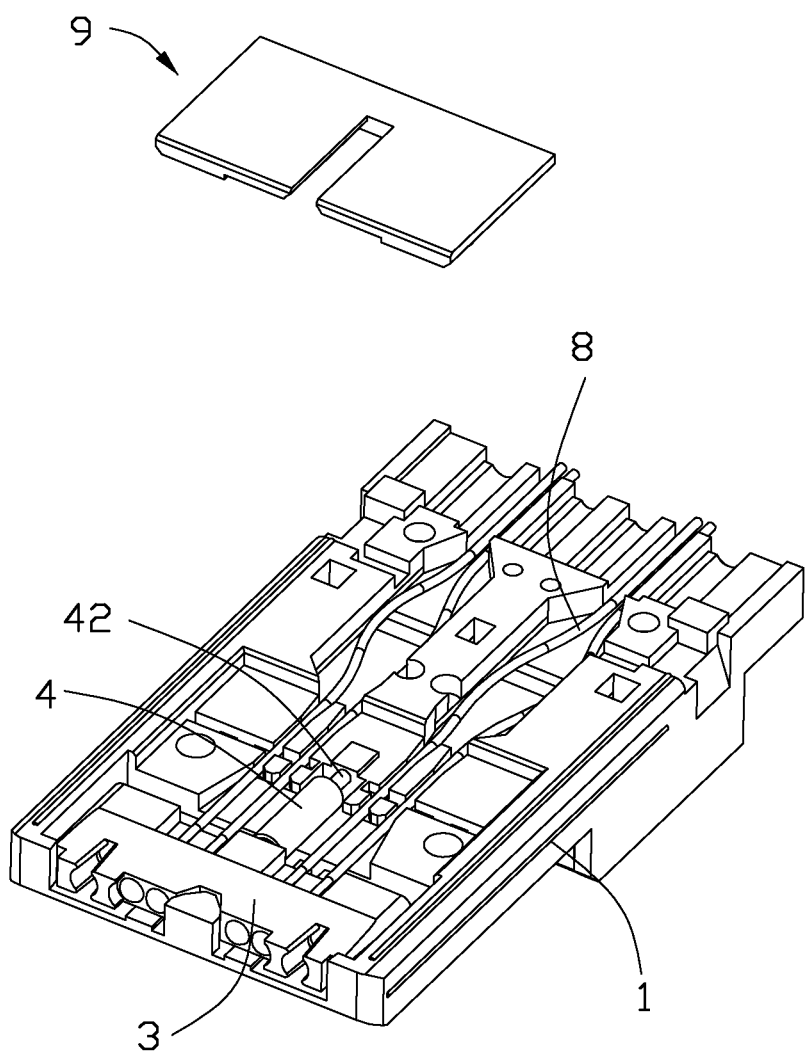
FIG. 4 is a partially assembled view of FIG. 1.
Figure 5:
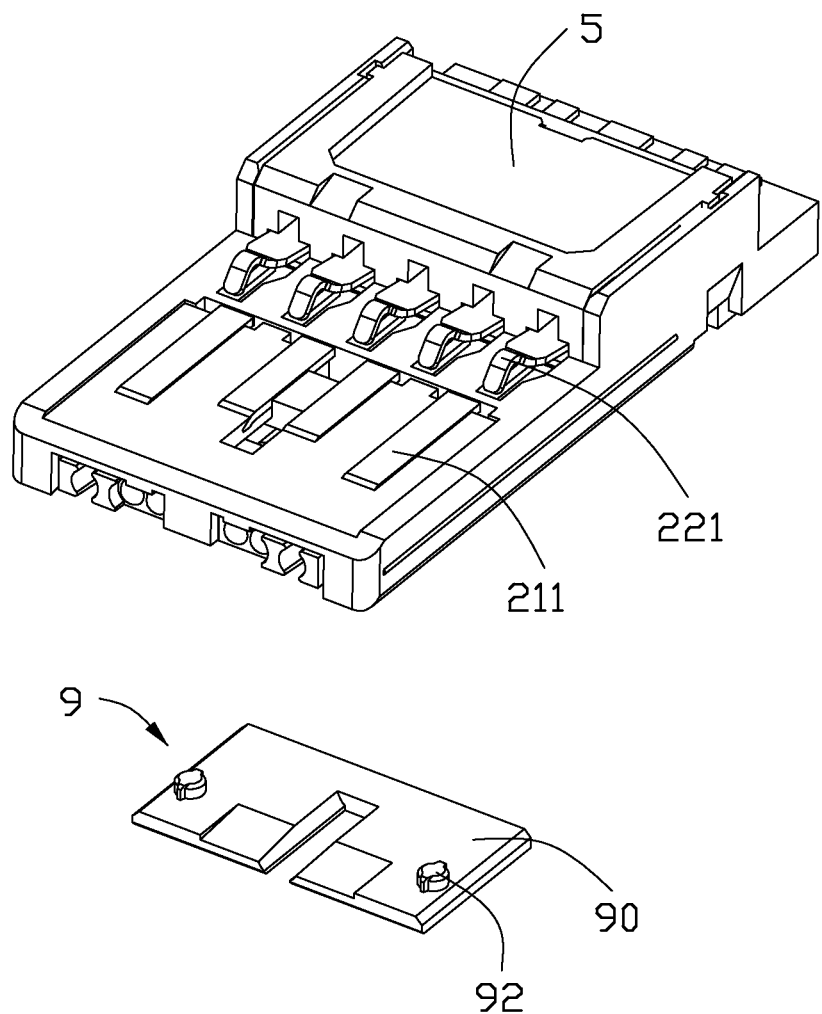
FIG. 5 is similar to FIG. 4, but viewed from another aspect.
Figure 6:
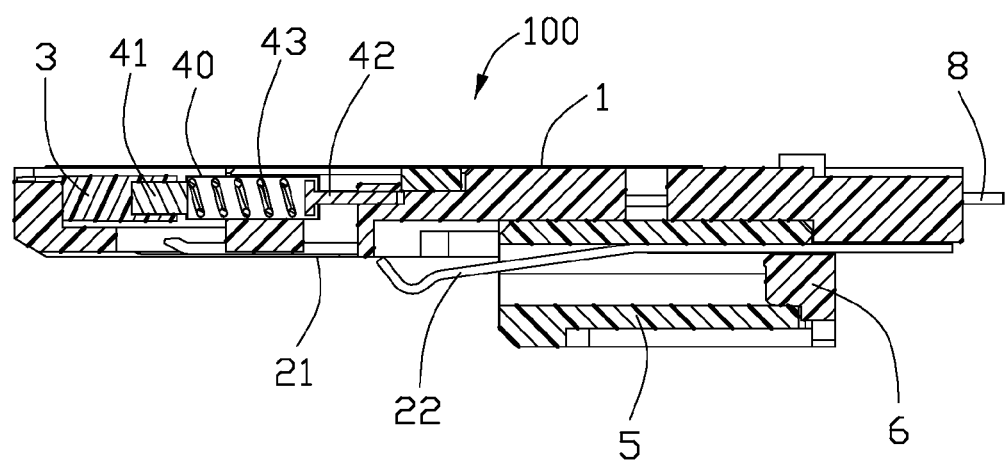
FIG. 6 is a cross section view of FIG. 1 taken along line 6-6.

Referring to FIGS. 1-6, a connector assembly 100 in accordance with the present invention comprises an insulative housing 1, a plurality of terminals 2 retained in or supported by the insulative housing 1, an optical module 3 mounted to the insulative housing 1, a biasing/deflecting member 4 located behind the optical module 3 so as to forwardly bias/deflect the optical module 3, a terminal seat 5, a spacer 6, a number of fibers 8 connecting with the optical module 3 and a cap 9 attached to the insulative housing 1 to position the fibers 8 and the biasing member 7. The connector assembly 100 may further comprising a metallic shell (not shown) shrouding the insulative housing 1

The insulative housing 1 includes a main portion 11 and a tongue portion 12 extending forwardly from the main portion 11.

There are two fiber passages 111 located in a top side of a back segment of the tongue portion 12 and a front segment of the main portion 11. There is a longitudinal rib 1111 formed in a front part of the fiber passage 111 and the rib 1111 also extends along the front-to-back direction. There are two retaining slots 112 located in a back segment of the main portion 11. The retaining slot 112 communicates with the fiber passage 111. The fiber passage 111 is deeper than the retaining slot 112. There is a recess 113 located in a bottom side of the main portion 11. The terminal seat 5 is accommodated in the recess 113. There is a cavity 121 defined in a top side of a front segment of the tongue portion 12. The cavity 121 is deeper than the fiber passage 111. In addition, there is a channel 122 defined in the tongue portion 12 and located between the cavity 121 and the fiber passage 111. There is a positioning hole 1221 recessed backwardly from a back side of the channel 122. There is a V-shaped stopper 124 located in middle segment of a front end of the tongue portion 12. Two lower tabs 126 are arranged at opposite sides of the stopper 124. A set of first terminal grooves 127 and a set of second terminal grooves 128 defined in a bottom side of the tongue portion 12. The first terminal grooves 127 are disposed in front of the second terminal grooves 128.

An arrangement of the terminals 2 is in accordance with USB 3.0 standard. The terminals 2 are divided into a set of first terminals 21 and a set of second terminals 22. The first terminals 21 and the second terminals 22 are separated into two distinct rows along the front-to-back direction.

The set of first terminals 21 have four contact members arranged in a row along the transversal direction. Each first terminal 21 substantially includes a planar retention portion 212 supported by a bottom surface of the recess 113, a mating portion 211 raised upwardly and extending forwardly from the retention portion 212 and received in the corresponding first terminal groove 127, and a tail portion 213 extending rearward from the retention portion 212. Furthermore, the mating portion 211 and the tail portion 213 are disposed at opposite sides (bottom side and top side) of the insulative housing 1.

The set of second terminals 22 have five contact members arranged in a row along the transversal direction and combined with the terminal seat 5. The set of second terminals 22 are separated into two pairs of signal terminal for transmitting differential signals and a grounding terminals disposed between the two pair of signal terminals. Each second terminal 22 includes a planar retention portion 222 received in the terminals seat 5, a curved mating portion 221 extending forward from the retention portion 222 and disposed beyond a front surface of the terminal seat 5, and a tail portion 223 extending rearward from the retention portion 222 and disposed behind a back surface of the terminal seat 5. The spacer 6 is assembled to the terminal seat 5, with a number of ribs (not numbered) thereof inserted into the grooves (not numbered) of the terminal seat 5 to position the second terminals 22. The mating portion 221 is deformable along a upper-to-down direction and can enter the corresponding second terminal groove 128 while pressed by its counterpart of a complementary connector.

The optical module 3 includes four lens members 33 arranged in juxtaposed manner and combined with a base portion 30. The base portion 30 further defines a cutout 32 in middle segment of a front side thereof. There are two tapered aligning holes 34 located in lateral sections of the base portion 30. In addition, there is a mounting hole 36 recessed forwardly from a middle segment of the base portion 30.

The biasing/deflecting member 4 includes a holder 40, an elastic element 43 accommodated in the holder 40, a second post 41 combined a front segment of the holder 40 and extending forwardly, a first post 42 assembled to a back segment of the holder 40 and extending backward. The first post 42 can slide in the holder 40. That is to say, the first post 42 can retract into the holder 40 to compress the elastic element 43. In the preferred embodiment, the holder 40 is a cylindrical structure, and the first post 42 and the second post 41 are solid body, while in other embodiment, they may be pipe shape structure. Also in the preferred embodiment, the second post 41 is unitarily formed with the holder 40, while in other embodiment, the second post 41 may also moveable with regarding to the holder 40. The elastic element 43 may be a coil spring and coaxially arranged with regarding to the holder 40. The coil spring only moves along an axial of the holder 40 and does not wiggle along a radial direction thereof. Therefore, the first post 42 is urged axial movement with regarding to the holder 40 so as to biasing/pushing the optical module 3 sliding inside the cavity 121.

The optical module 3 is accommodated in the cavity 121, the second post 41 of the biasing member 4 is inserted into mounting hole 36 of the base portion 30 to achieve firm engagement therebetween, the first post 42 of the biasing member 4 is inserted into the positioning hole 1221 to achieve firm engagement therebetween. The optical module 3 is pushed forwardly and floatable within the cavity 121 by the biasing member 4. The stopper 124 is accommodated in the cutout 32 to prevent the optical module 3 from escaping the insulative housing 1.

The fibers 8 extend into fiber passages 111 via the retaining slots 112 and then pass through the channel 122 and are respectively coupled to the lenses 33 of the optical module 3. As the channel 122 is configured to be tapered shape and has enough space for the fibers 8 to move therein. In addition, the fibers 8 are properly inhibited within the fiber passages 111. There are two fibers 8 received in each fiber passage 111, and the two fibers 8 are spaced apart from each other by the rib 1111, therefore, they do not twist together. The cap 9 is mounted to the insulative housing 1 to shield the fiber passages 111 and the fibers 8 are positioned in the fiber passages 111. The cap 9 has a board shaped body portion 92 and two positioning members 91 formed at a bottom surface thereof and inserted into positioning holes 1223 defined in the insulative housing 1. In addition, there is a longitudinal cutout 94 defined in a middle section of the body portion 92, and a top edge of the holder 40 extending into the cutout 94. Therefore, the basing member 4 is sandwiched between the cap 9 and the tongue portion 12 of the insulative housing 1. As the optical module 3 and the terminals 2 are arranged at opposite sides of the insulative housing 1, hence it facilitates manufacturing proceed.

When the connector assembly 100 mating with a complementary connector (not shown), the optical module 3 may align with and backwardly pushed by its counterpart of the complementary connector, therefore, the optical signal transmits from the connector assembly 100 and the complementary connector. When the connector assembly 100 is disconnected from the complementary connector, the optical module 3 moves forwardly to its original position deflected/biased by the biasing/deflecting member 4. In addition, the optical module 3 smoothly moves inside the cavity 121 as it is pushed by balanced forward pushing force.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:
1. A connector assembly, comprising:
an insulative housing having a main portion and a tongue portion extending forwardly from the main portion, a cavity defined in the tongue portion;
a plurality of terminals retained in the insulative housing;
an optical module accommodated in the cavity, said optical module having a base portion and a plurality of lenses combined with the base portion; and
a biasing member having a holder, an elastic element accommodated in the holder and at least one post assembled to the holder and urged by the elastic element so as to push the optical module forwardly;
wherein there is a mounting hole defined in the base portion of the optical module to receive the post, and there is a positioning hole defined in the tongue portion to receive the other post.

2. The connector assembly as recited in claim 1, wherein the biasing member has two posts respectively arranged at a front and rear segment of the holder.

3. The connector assembly as recited in claim 2, wherein one of the posts is unitarily formed with the holder, the other post is assembled to the holder and capable of siding axially with regarding to the holder.

4. The connector assembly as recited in claim 1, wherein the elastic element is a coil spring.

5. The connector assembly as recited in claim 4, wherein the holder is a cylindrical structure and the coil spring moves in the holder only along an axial direction thereof.

6. The connector assembly as recited in claim 1, wherein there are plurality of fibers respectively coupled to the lenses of the optical module.

7. The connector assembly as recited in claim 6, wherein there is a cap mounted to the insulative housing to shield the fibers.

8. The connector assembly as recited in claim 7, wherein there are plurality of fiber passages located in the insulative housing to accommodate the fibers.

9. The connector assembly as recited in claim 8, wherein there is at least one fiber inside each fiber passage.

10. A connector assembly, comprising:
an insulative housing having a main portion and a tongue portion extending forwardly from the main portion, a cavity defined in the tongue portion;
a plurality of terminals retained in the insulative housing;
an optical module accommodated in the cavity; and
a biasing member adapted for forwardly pushing the optical module, the biasing member including a holder, an elastic element accommodated in the holder, a first post and a second post disposed at opposite sides of the elastic element, the first post and the second post respectively engaged with the insulative housing and the optical module, and at least one of the posts biased by the elastic element and axially moveable along the holder;
wherein the first post is capable of sliding relative to the holder along an axial direction, while the second post is combined with the holder.

11. The connector assembly as recited in claim 10, wherein the elastic element is a coil spring, and the holder is a cylindrical shaped structure.

12. The connector assembly as recited in claim 10, wherein there is a channel defined in the tongue portion and located behind the cavity, and the holder of the biasing member is disposed in the channel.

13. The connector assembly as recited in claim 12, wherein there is a positioning hole recessed backwardly from a back side of the channel to receive the first post.

14. The connector assembly as recited in claim 12, wherein there is a cap mounted to the insulative housing to position the holder.

15. The connector assembly as recited in claim 14, wherein the cap has a board shaped body portion with longitudinal cutout to receive a top edge of the holder.

16. An hybrid connector comprising:
an insulative housing defining a mating portion;
a plurality of contacts disposed in the housing with contacting sections exposed upon the mating port;
a lens modules located around the mating portion and back and forth moveable relative to the housing in a front-to-back direction; and
a holder defining a cavity to protectively receive a spring therein and being equipped with opposite first and second posts by two ends of the cavity in said front-to-back direction to respectively urge the lens module and the housing; wherein
deformation of the spring is guided in the holder to urge at least one of said first and second posts to move away from the holder;
wherein the first post and the second post are differently diametrically dimensioned.

17. The hybrid connector as claimed in claim 16, wherein the other one of the first and second post is integrally formed with the holder.

* * * * *